United States Patent
Mochizuki

(10) Patent No.: US 8,727,591 B2
(45) Date of Patent: May 20, 2014

(54) LIGHT EMITTING DEVICE AND OPTICAL ELEMENT

(75) Inventor: Keiichi Mochizuki, Nagano (JP)

(73) Assignees: Nittoh Kogaku K.K. (JP); Yashuhiro Koike (JP)

( * ) Notice: Subject to any disclaimer, the term of this patent is extended or adjusted under 35 U.S.C. 154(b) by 285 days.

(21) Appl. No.: 13/202,806

(22) PCT Filed: Feb. 16, 2010

(86) PCT No.: PCT/JP2010/000948
§ 371 (c)(1),
(2), (4) Date: Aug. 23, 2011

(87) PCT Pub. No.: WO2010/098036
PCT Pub. Date: Sep. 2, 2010

(65) Prior Publication Data
US 2011/0299295 A1 Dec. 8, 2011

(30) Foreign Application Priority Data
Feb. 24, 2009 (JP) .................................. 2009-041168

(51) Int. Cl.
*F21V 7/04* (2006.01)
(52) U.S. Cl.
USPC ........................... 362/555; 362/551; 362/558
(58) Field of Classification Search
USPC ......................................... 362/551, 555, 558
See application file for complete search history.

(56) References Cited

U.S. PATENT DOCUMENTS

| 4,929,866 A | 5/1990 | Murata et al. |
| 7,864,381 B2 | 1/2011 | Scott |
| 2002/0106182 A1 * | 8/2002 | Kawashima ................. 385/146 |
| 2006/0014573 A1 | 1/2006 | Wuidart |
| 2006/0146273 A1 | 7/2006 | Jang |
| 2006/0146573 A1 * | 7/2006 | Iwauchi et al. ............... 362/621 |
| 2009/0201696 A1 * | 8/2009 | Kamikatano et al. ......... 362/551 |
| 2009/0290340 A1 | 11/2009 | Hayakawa |

FOREIGN PATENT DOCUMENTS

| EP | 1574780 A1 | 9/2005 |
| JP | 1-251502 A | 10/1989 |
| JP | 10-177807 A | 6/1998 |
| JP | 2003-161839 A | 6/2003 |

(Continued)

OTHER PUBLICATIONS

International Search Report for International Application No. PCT/JP2010/000948 mailed May 18, 2010.

*Primary Examiner* — Sean Gramling
(74) *Attorney, Agent, or Firm* — Cantor Colburn LLP

(57) ABSTRACT

Disclosed are a light emitting device and a light emitting element that can decrease fabrication difficulties, while improving lighting efficiency and controlling the distribution of intensity that occurs in the emitted light. A light emitting device comprises a rod-shaped light guide, an LED that inputs light to the light guide, and a prism that changes the direction of light input from the lengthwise end of the light guide, and emits redirected light from a light exit surface that is disposed opposite the prism. The light emitting device is constituted so that an input lens is formed at the lengthwise end of the light guide as a parallel light forming body to make light exiting from the LED toward the light guide nearly parallel light, and the LED is shifted from the center axis of the light guide toward the side closer to the prism, or toward the side away from the prism, and thus said nearly parallel light is directed to the exit surface of the light guide or to the prism.

15 Claims, 7 Drawing Sheets

(56) References Cited

FOREIGN PATENT DOCUMENTS

| JP | 2003-344852 A | 12/2003 |
| JP | 2004-227956 A | 8/2004 |
| JP | 2006-294343 A | 10/2006 |
| JP | 2008198458 A | 8/2008 |
| JP | 2008236747 A | 10/2008 |
| WO | 2004/055429 A1 | 7/2004 |

* cited by examiner

LIGHT EMITTING DEVICE AND OPTICAL ELEMENT

CROSS REFERENCE TO RELATED APPLICATIONS

The present application is a national phase of an International application No. PCT/JP2010/000948, filed on Feb. 16, 2010, and which claims priority from Japanese Patent Application No. 2009-041168, filed on Feb. 24, 2009, the contents of which are incorporated herein by reference.

BACKGROUND OF THE INVENTION

1. Field of the Invention

The present invention relates to a light emitting device and an optical element.

2. Description of Related Art

Described below is a light device using LEDs (Light Emitting Diodes) as a light source. The light device includes a plurality of LEDs placed in series on a substrate at certain intervals and a plurality of reflecting mirrors mounted on the substrate; wherein each of the reflecting mirrors is so constructed as to cover each of the LEDs, and the reflecting mirror includes a light reflecting surface and a light mixing reflecting surface; while the light reflecting surface is a flat-formed section of one side surface, except a bottom part, in a direction perpendicular to the placement direction of the plurality of LEDs in series, and the light mixing reflecting surface is the other side surface that can both reflect and mix a ray of light coming from the LED (Refer to Patent Document 1).

Meanwhile a lighting device for scanning application described below is proposed as another lighting device using an LED for a light source. The lighting device for scanning application includes an optical element constituting an entrance surface, and a rear surface and a light exit surface located opposite to each other. Then, in the lighting device, the light exit surface is almost perpendicular to the entrance surface, and in the meantime the rear surface has a reflecting element including a plurality of prisms for orienting light, coming out of the entrance surface, toward a front surface. Furthermore, in the lighting device, a particulate material is placed between the reflecting element and the front surface for diffusing the incoming light. Moreover, the lighting device includes at least one LED light source positioned to be adjacent to the entrance surface (Refer to Patent Document 2).

PRIOR ART DOCUMENT

Patent Documents

Patent Document 1: JP 2008-198458 A
Patent Document 2: JP 2008-236747 A

SUMMARY OF THE INVENTION

Unfortunately, the lighting device described in Patent Document 1 needs a lot of LEDs. Moreover, in each LED, brightness of a light radiating part is quite different from that of other part. Therefore, when the lighting device being used as a lighting device for scanning application, a light diffusion member is required for diffusing the output light on a grand scale. Accordingly, notwithstanding quite a few LEDs being used, the output light does hardly become luminous enough. Meanwhile, the lighting device described in Patent Document 2 is likely to have a poor light efficiency, because of the output light passing through the reflecting element, and also likely to cause uneven intensity in the output light. For suppressing such deterioration in light efficiency and controlling uneven intensity in the output light, it is effective to place a plurality of prisms as a reflecting element in a very dense state. Unfortunately, in the meantime, such placement of a plurality of prisms in a very dense state accompanies difficulties in manufacturing such a lighting device.

Thus, it is an object of the present invention to provide a light emitting device and an optical element that can ease difficulties in manufacturing themselves while improving the light efficiency and controlling uneven intensity in the output light.

To achieve the object described above, a light emitting device according to the present invention comprises: a rod-shaped light guide; a light source which inputs light to the light guide; and a prism part which changes the direction of light input from the length-wise end of the light guide, and emits redirected light from a light exit surface that is disposed opposite the prism part; in which: a parallel light forming body, which makes light emitted from the light source toward the light guide nearly parallel light, is formed at the length-wise end of the light guide; and the light source is shifted from the center axis of the light guide toward the side closer to the prism part, or toward the side away from the prism part, for the nearly parallel light to be directed to the light exit surface of the light guide or to the prism part.

The light source may be preferably tilted with respect to the center axis of the light guide.

It may be preferable that the parallel light forming body is a convex lens that swells toward the light source.

The light emitting device may preferably comprise a reflecting member which is placed around the light source and makes light which does not enter the light guide directly from the light source input to the light guide.

It may be preferable that a light scattering guide, which contains light scattering particles for multiple-scattering the light emitted from the light source toward the light guide, is provided on the light exit surface of the light guide.

The prism part may be preferably placed in parallel with the light exit surface.

To achieve the object described above, an optical element according to the present invention comprises: a rod-shaped light guide; and a prism part which changes the direction of light input from the length-wise end of the light guide, and emits redirected light from a light exit surface that is disposed opposite the prism part; in which: a parallel light forming body, which makes light emitted from a light source toward the light guide nearly parallel light, is formed at the length-wise end of the light guide.

It may be preferable that a light scattering guide, which contains light scattering particles for multiple-scattering the light emitted from the light source toward the light guide, is provided on the light exit surface of the light guide.

The optical element according to claim 8: in which the light scattering guide is rod-shaped; and a surface of the light scattering guide, being opposite to another surface that faces the light guide, swells at a center part in a width-wise direction to form a convex-curved surface.

The light guide and the light scattering guide may be formed together into a single piece.

The light guide may preferably contain light scattering particles for multiple-scattering the input light.

It may be preferable that the light scattering particles are translucent silicon particles with their particle diameter within a range from 2 to 9 micrometers.

It may be preferable that the light scattering particles contained in the light guide have turbidity expressed as "τ", which is a scattering parameter corresponding to a scattering coefficient of the light guide, within a range of "0<L/(2×τ) <30", wherein "L" is the length of the light guide in the center axis direction.

It may be preferable that the light scattering particles contained in the light scattering guide have turbidity expressed as "τ", which is a scattering parameter corresponding to a scattering coefficient of the light scattering guide, within a range of "1<T/τ<10", wherein T is a maximum thickness of the light scattering guide in a direction perpendicular to the light exit surface.

ADVANTAGEOUS EFFECT OF THE INVENTION

According to the present invention, provided can be a light emitting device and an optical element that can ease difficulties in manufacturing themselves while improving the light efficiency and controlling uneven intensity in the output light.

DETAILED DESCRIPTION OF THE PREFERRED EMBODIMENTS

Structures and functions of an optical element and a light emitting device according to an embodiment of the present invention are described below with reference to the accompanied drawings.

(Structure of Optical Element)

Figure 1:
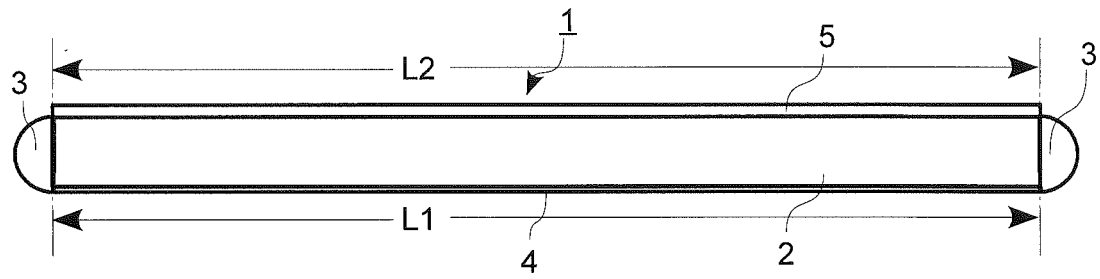
FIG. 1 is a front elevation view to show a structure of a light guiding member as an optical element according to an embodiment of the present invention.
Figure 2:
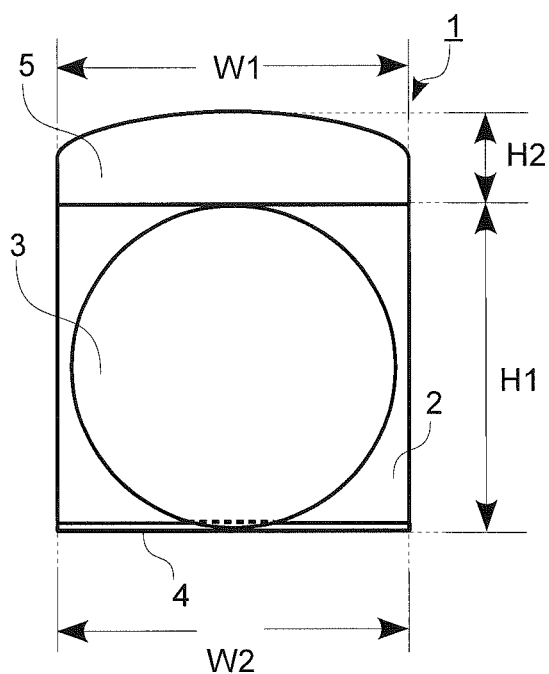
FIG. 2 is a front elevation view of the light guiding member shown in FIG. 1.

FIG. 1 is a plan view drawing to show a structure of a light guiding member 1 as an optical element according to an embodiment of the present invention, and in the meantime, FIG. 2 is a side view of the structure.

As shown in FIG. 1 and FIG. 2, the light guiding member 1 is rod-shaped, having an external form shaped nearly like a long square pole. The light guiding member 1 includes: a light guide 2; input lenses 3 placed at both ends of the light guide 2 in its longitudinal direction; a prism part 4 formed at a bottom of the light guide 2 shown in FIG. 1 and FIG. 2, being as a part of the light guide 2; and a light scattering guide 5 placed on a top surface of the light guide 2.

The light guide 2 is formed as a resin molding body made of transparent poly-methyl methacrylate (hereinafter abbreviated to "PMMA"), being shaped as a square pole. The input lenses 3 are also made of PMMA, and they are convex lenses, while each having its cross-sectional shape with a hyperbolic curve. In the meantime, the light guide 2 and the input lenses 3 are formed together as an integral single-piece.

Each of the input lenses 3 working as a parallel light forming body is, as described above, a convex lens which swells away from the light guide 2; namely it is a convex lens swelling outward. In FIG. 1 and FIG. 2, detailed information on the shape of the prism part 4 is not given, and the prism part 4 is explained later in detail.

The light scattering guide 5 is formed as a PMMA resin molding body that contains spherical and translucent silicone particles (not illustrated) with their particle diameter of 2 to 9 micron meters, as light scattering particles. A dimension L2 in a length-wise direction of the light scattering guide 5 and a dimension W2 in a width-wise direction of the same are identical to a dimension L1 in a length-wise direction and a dimension W1 in a width-wise direction of the light guide 2, respectively. Meanwhile, a dimension H2 in a thickness-wise direction of the light scattering guide 5 is less than a dimension H1 in a thickness-wise direction of the light guide 2. As shown in FIG. 2, a top surface of the light scattering guide 5 swells from both ends in the width-wise direction toward a center area of the top surface. The swell is formed as a part of a circumferential wall of a circular column. In other words, a wall surface of the light scattering guide 5 is a part of a circumferential wall of a circular column. Incidentally, the light guide 2 and the light scattering guide 5 are formed together into a single piece through molding of two component materials.

In the meantime, the light scattering particles contained in the light scattering guide 5 have turbidity expressed as "τ" (unit: in centimeters), which is a scattering parameter corresponding to a scattering coefficient of the light scattering guide 5, within a range of "1<T/τ<10", wherein T (unit: in centimeters) is a maximum thickness (H2) of the light scattering guide 5 in a direction perpendicular to the light exit surface 6.

The silicone particles contained in the light scattering guide 5 are described next. The silicone particles are light guiding elements provided with a uniform scattering power within their volume-wise extent, and they include a number of spherical particles as scattering fine particles. When light enters an internal area of the light guide 5, the light is scattered by the scattering fine particles.

The Mie scattering theory that provides the theoretical fundamentals of the silicone particles is explained next. Calculated in the Mie scattering theory is a solution for Maxwell's equations of electromagnetism in the case where spherical particles (scattering fine particles) exist in a ground substance (matrix) having a uniform refractive index, wherein the spherical particles having a refractive index that is different from the refractive index of the matrix. A formula (1) described below expresses a light intensity distribution I (A, Θ) dependent on the angle of light scattered by scattering fine particles that correspond to the light scattering particles. "A" is a size parameter representing an optical size of the scattering fine particles, and the parameter shows an amount corresponding to a radius "r" of the spherical particles (the scattering fine particles) standardized with a wavelength "λ" of light in the matrix. Meanwhile, an angle "Θ" represents a scattering angle, wherein a direction identical to the traveling direction of the incident light corresponds to "Θ=180 deg."

The parameters "i1" and "i2" in the formula (1) are expressed with formulas (4). Then, "a" and "b" subscripted with "ν" in formulas (2) to (4) are expressed with formulas (5). $P(\cos \Theta)$ superscripted with "1" and subscripted with "ν" is a Legendre polynomial; meanwhile "a" and "b" subscripted with "ν" are composed of Recatti-Bessel functions Ψ* and ζ* (wherein "*" shows a subscript of "ν") of the first and second orders and their derivatives. The parameter "m" is a relative refractive index of the scattering fine particles with reference to the matrix, namely "m=n-scatter/n-matrix."

[Expression 1]

$$I(A, \Theta) = \frac{\lambda^2}{8\pi^2}(i_1 + i_2) \tag{1}$$

$$K(A) = \left(\frac{2}{\alpha^2}\right)\sum_{\nu=1}^{\infty}(2\nu + 1)(|a_\nu|^2 + |b_\nu|^2) \tag{2}$$

$$A = 2\pi r / \lambda \tag{3}$$

$$i_1 = \left|\sum_{\nu=1}^{\infty} \frac{2\nu+1}{\nu(\nu+1)}\left\{a_\nu \frac{P_\nu^1(\cos\Theta)}{\sin\Theta} + b_\nu \frac{dP_\nu^1(\cos\Theta)}{d\Theta}\right\}\right| \tag{4}$$

$$i_2 = \left|\sum_{\nu=1}^{\infty} \frac{2\nu+1}{\nu(\nu+1)}\left\{b_\nu \frac{P_\nu^1(\cos\Theta)}{\sin\Theta} + a_\nu \frac{dP_\nu^1(\cos\Theta)}{d\Theta}\right\}\right|$$

$$a_\nu = \frac{\Psi_\nu'(mA)\Psi_\nu(A) - m\Psi_\nu(mA)\Psi_\nu'(A)}{\Psi_\nu'(mA)\zeta_\nu(A) - m\Psi_\nu(mA)\zeta_\nu'(A)} \tag{5}$$

$$b_\nu = \frac{m\Psi_\nu'(mA)\Psi_\nu(A) - \Psi_\nu(mA)\Psi_\nu'(A)}{m\Psi_\nu'(mA)\zeta_\nu(A) - \Psi_\nu(mA)\zeta_\nu'(A)}$$

Figure 3:
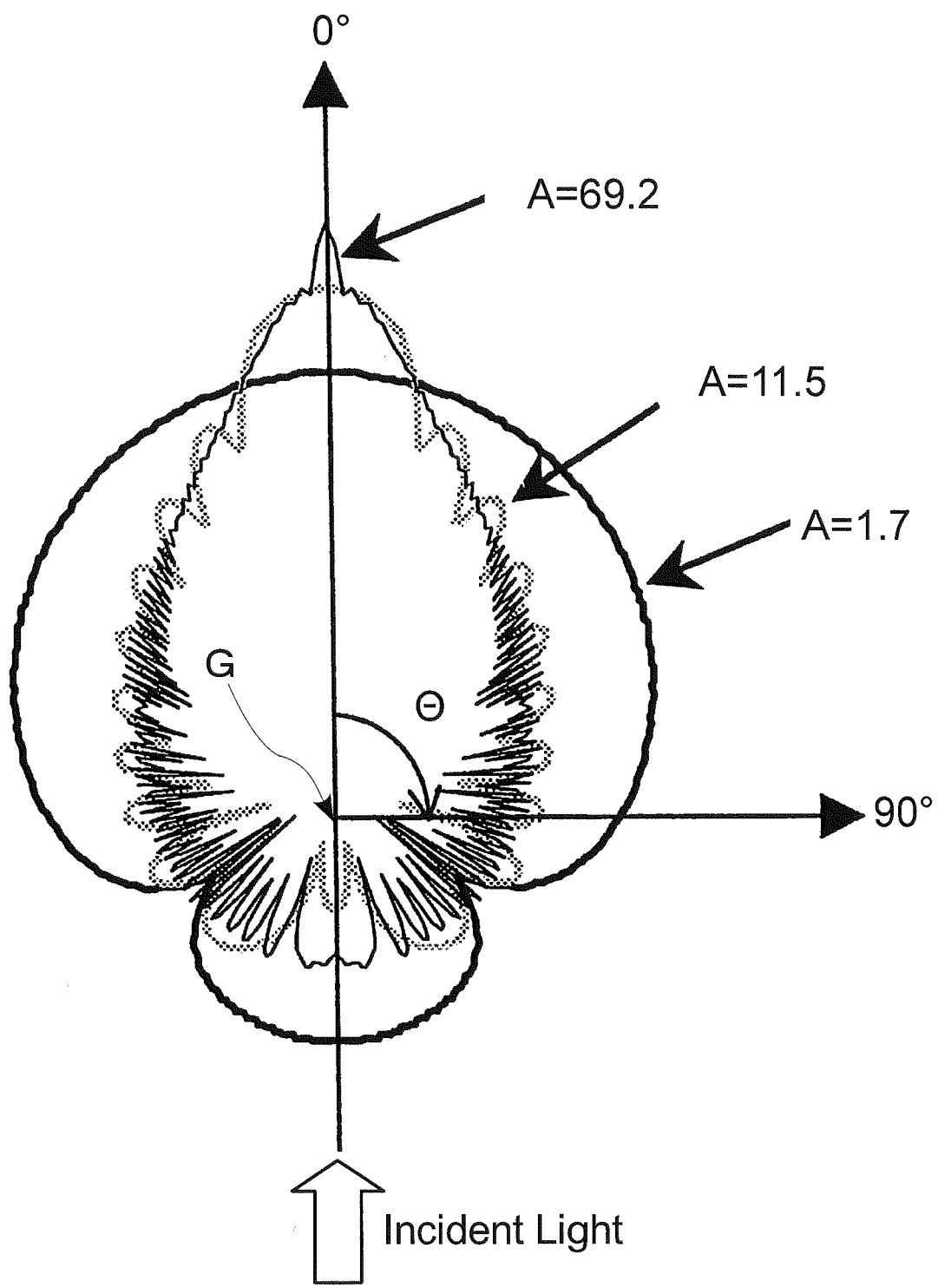
FIG. 3 is a drawing that explains a theory of light scattering by a silicon particle of a light scattering guide included in the light guiding member shown in FIG. 1; namely it is a graph showing an angle distribution (A, Θ) of a scattered light intensity by a single spherical particle.

FIG. 3 is a graph showing a light intensity distribution I (A, Θ) by a single spherical particle on the basis of the above formulas (1) to (5). Namely, FIG. 3 shows an angular distribution of scattered light intensity I (A, Θ) in the case of incident light coming in from a lower side, wherein a spherical particle as a scattering fine particle exists at a position of an origin "G". In the figure, a distance from the origin "G" to each of curves S1 to S3 represents the scattered light intensity in a corresponding angular direction of the scattered, light. Each curve of S1, S2, and S3 shows the scattered light intensity when the size parameter "A" is 1.7, 11.5, and 69.2, respectively. In FIG. 3, the scattered light intensity is expressed in a logarithmic scale. Therefore, even a slight difference of intensity that appears in FIG. 3 is a significantly large difference in fact.

As shown FIG. 3, it is understood that; the greater the size parameter "A" is (the larger the particle diameter is, at a certain wavelength "λ"), the more intensively the light is scattered in an upward direction (a frontward direction in the direction of radiation) with a directivity. In reality, the angular distribution of scattered light intensity I (A, Θ) can be controlled by using the radius "r" of the scattering element and the relative refractive index "m" between the matrix and the scattering fine particles as parameters, while the wavelength "λ" of the incident light is set to be constant. Incidentally, in the light scattering guide 5, frontward scattering is significant.

Thus, when light enters a light scattering guide body that contains N (in number) single spherical particles, the light is scattered by a spherical particle. Moving forward through the light scattering guide body, the scattered light is then scattered again by another spherical particle. In the case where particles are added with a certain volume concentration or higher, such scattering operation sequentially repeats several times and then the light is output from the light scattering guide body. A phenomenon in which scattered light is further scattered is called a multiple scatter phenomenon. Though it is not easy to analyze such a phenomenon of multiple scattering in a translucent polymer substance by means of a ray tracing method, the behavior of light can be traced by Monte Carlo method for analysis of its characteristics. According to the analysis, in the case of incident light having no polarization, a cumulative distribution function of scattering angle "F(Θ)" is expressed with a formula (6) described next.

[Expression 2]

$$F(\Theta) = \frac{\int_0^{\Theta} I(\Theta)\sin\Theta \, d\Theta}{\int_0^{\pi} I(\Theta)\sin\Theta \, d\Theta} \quad (6)$$

"I(Θ)" in the formula (6) means the scattered light intensity of the spherical particle of the size parameter "A" expressed in the formula (1). When light having an intensity "I0" enters the light scattering guide body, and passes through a distance "y" so as to be attenuated into "I" through the scattering, a formula (7) described below represents a relationship of the phenomenon.

[Expression 3]

$$\frac{I}{I_0} = \exp(-\tau y) \quad (7)$$

The parameter "τ" in the formula (7) is called the turbidity (having the same meaning as the "scattering parameter" mentioned previously); and it corresponds to a scattering coefficient of the matrix, and being proportional to the number of particles "N", as a formula (8) indicates below. In the formula (8), "σs" represents a scattering cross-section.

[Expression 4]

$$\tau = \sigma^s N \quad (8)$$

According to the formula (7), the probability "Pt(L)" for light to pass through the light scattering guide body having its length "L" without any scattering is expressed by a formula (9) described below.

[Expression 5]

$$p_t(L) = \frac{I}{I_0} = \exp(-\sigma^s N L) \quad (9)$$

On the contrary, the probability "Ps(L)" for light to be scattered within the optical path length "L" is expressed by a formula (10) described below.

[Expression 6]

$$p_\tau(L) = 1 - p_t(L) = 1 - \exp(-\sigma^s N L) \quad (10)$$

It is understood according to the formulas described above that adjusting the turbidity "τ" makes it possible to control a degree of multiple scattering in the light scattering guide body.

As the formulas indicate above, by using at least one of the size parameter "A" and the turbidity "τ" with respect to the scattering fine particles as a parameter, it becomes possible to control multiple scattering in the light scattering guide body, and also to suitably set the output light intensity and the scattering angle at a light exit surface.

Figure 4:
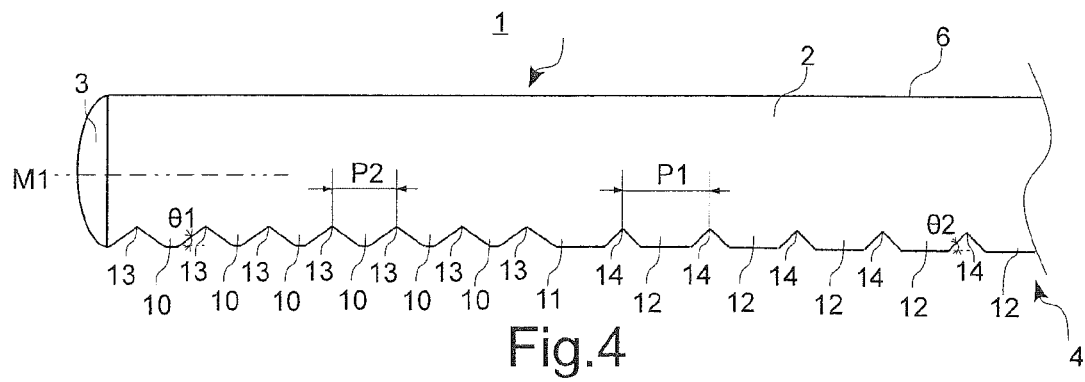
FIG. 4 is a schematic view showing a side shape of a prism part of the light guide according to the embodiment of the present invention.

FIG. 4 is a schematic view showing a side shape of the prism part 4 that exists in almost half an extent of the light guide 2 from an end of the light guide 2. Being a surface opposite to the light exit surface 6 as a topside surface of the light guide 2, namely, a bottom surface of the light guide 2 includes trapezoidal convex parts 10, 11, and 12. Then, owing to the neighboring convex parts 10, 11, and 12, there are formed sawtooth-like indent parts 13 and 14. Peaks of the saw teeth correspond to most indented parts of the indent parts 13 and 14. Thus, the convex parts 10, 11, and 12 together with the indent parts 13 and 14 constitute the prism part 4. An indent angle of the indent parts 13 at both ends of the long light guide 2, namely a prism angle θ1 (30 degrees), is made to be large; while a prism angle θ2 (40 degrees) of the indent parts 14 at a central part of the long light guide 2 is made to be smaller than θ1. A shape of the prism part 4 is bilaterally symmetric with respect to a center of the light guide 2 in the length-wise direction, and it is symmetric with respect to a center in the width direction as well. A peak-to-peak pitch P1 of the indent parts 14 at the center area of the light guide 2 is made to be longer than a peak-to-peak pitch P2 of the indent parts 13 at both the end areas of the light guide 2. Incidentally, the convex parts 10, 11, and 12 together with the indent parts 13 and 14 are formed at the same time when the light guide 2 and the input lenses 3 are formed together as an integral single-piece by using a mold.

(Structure of Light Emitting Device)

Figure 5:
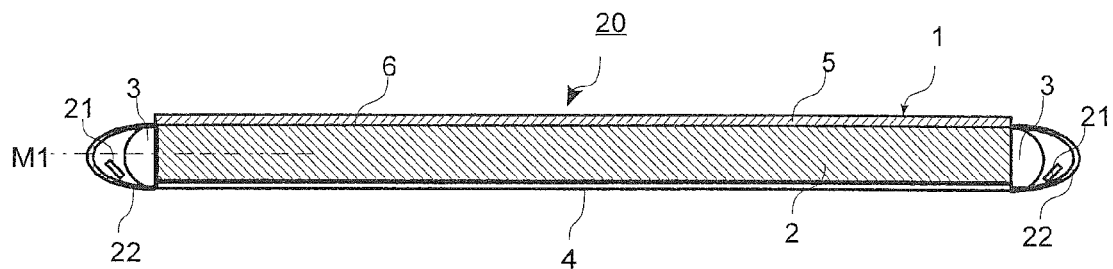
FIG. 5 is a longitudinal cross-section view of a light emitting device according to the embodiment of the present invention.

FIG. 5 is a longitudinal cross-section view of a light emitting device 20 using the light guiding member 1. An LED 21 as a light source and a mirror member 22 as a reflecting member are fixedly positioned at each of both ends of the light guiding member 1. Each LED 21 is a chip type device. Each LED 21 is placed at a position closer to the prism part 4 (a lower position in FIG. 5) away from an optical axis M1 of a corresponding one of the input lenses 3. In other words, Each LED 21 is shifted downward from the optical axis M1. As a result of the displacement, a position of each LED 21 is located at an intermediate point between the optical axis M1 and the prism part 4. Then, the optical axis M1 of the input lens 3 is in parallel with the prism part 4, and also parallel with the light exit surface 6, and furthermore it is a line passing through a center of the input lens 3. Meanwhile, each LED 21 is so tilted at 45 degrees with respect to the optical axis M1 as to radiate light to the input lens 3 in a slantwise upward direction from a lower side in FIG. 5. In other words, a surface of each LED 21 is not perpendicular to the optical axis M1, but slanted and namely it is tilted. Consequently, each LED 21 is shifted toward the prism part 4 with respect to the optical axis M1, and so tilted as to face the light exit surface 6.

Each mirror member 22 is so formed as to have a cup shape with a parabolic curve in the longitudinal cross-section view shown in FIG. 5. In any cross-section view including the optical axis M1, the parabolic curve always becomes the same. Furthermore, the parabolic curve is placed in such a way that its focal point is located on the optical axis M1. An internal surface of the cup-shaped mirror member 22 is mirror-finished for reflecting the light from the LED 21. An open end of the cup-shaped mirror member 22 covers an end of the light guiding member 1 for sealing up the connection part in such a way that the light from the LED 21 does not leak from the connection part between the mirror member 22 and the light guiding member 1. Therefore, most of the light from the LED 21, placed at each of both the ends of the light guiding member 1, enters the light guiding member 1.

(Situations of Light Input and Light Output of the Light Emitting Device 20 when the LED 21 is Turned on)

Figure 6:
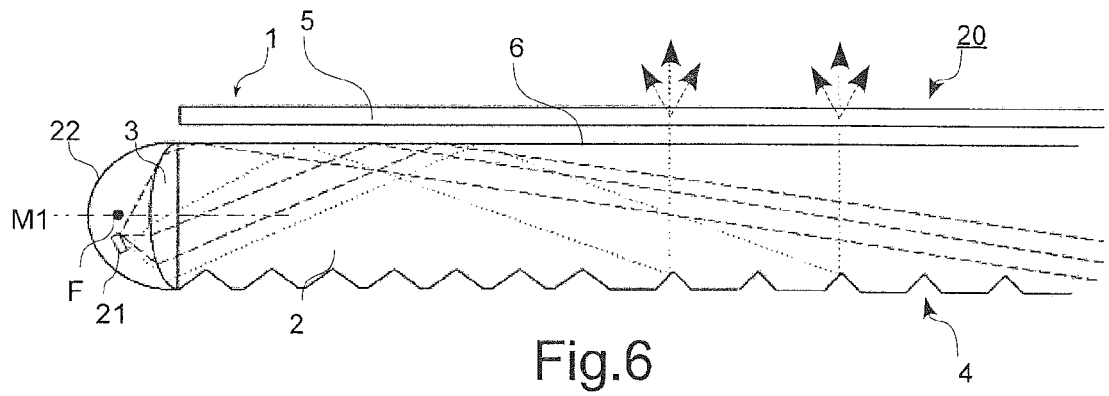
FIG. 6 is a drawing that shows situations of light input and light output under conditions where an LED of the light emitting device according to the embodiment of the present invention is turned on; namely it is a schematic view showing paths of light, emitted from both ends of the LED so as to directly enter an input lens, wherein the LED is shifted toward the prism part and tilted there.
Figure 7:
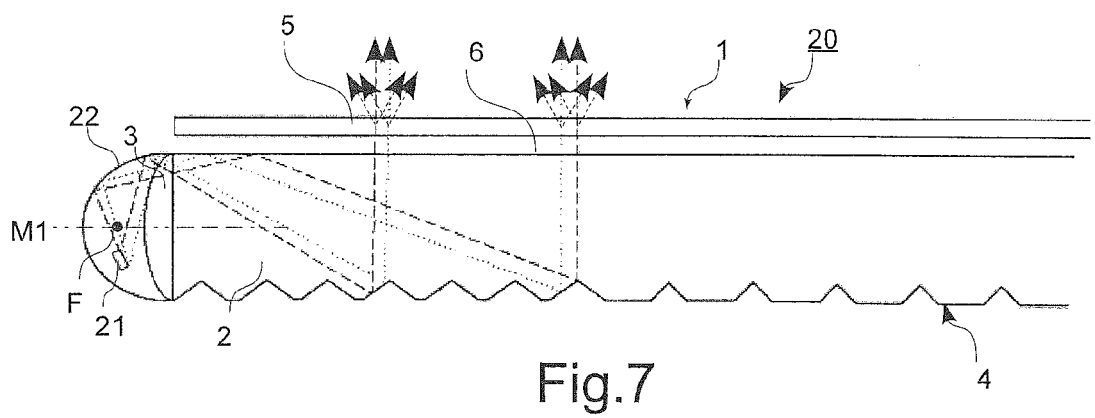
FIG. 7 is a drawing that shows situations of light input and light output under conditions where the LED of the light emitting device according to the embodiment of the present invention is turned on; namely it is a schematic view showing paths of light, emitted from both ends of the LED so as to be once reflected by a mirror member and then enter the input lens, wherein the LED is shifted toward the prism part and tilted there.

FIG. 6 and FIG. 7 are schematic views showing situations of light input and light output in the light emitting device 20 when the LED 21 is turned on. In FIG. 6, light from the LED 21 directly enters the input lens 3, and indicated are paths of the light emitted from both ends of the LED 21 (Indicated in the figure is only the LED 21 positioned at the left end of the light emitting device 20). Meanwhile, in FIG. 7, light from the LED 21 is once reflected by the mirror member 22 and then enters the input lens 3, and indicated are paths of the light emitted from both ends of the LED 21 (indicated in the figure is only one LED 21 positioned at the left end of the light emitting device 20). Fine dotted arrowed lines show paths of emitted from a lower end of the LED 21 shown in FIG. 6 and FIG. 7. Then, light emitted from a center of the LED 21 passes through light paths between both the light paths that are shown, and those light paths are not illustrated in the figures. Rough broken arrowed lines show paths of light emitted from a higher end of the LED 21 shown in FIG. 6 and FIG. 7. Incidentally, for clearly describing situations of light reflection at the light exit surface 6, which is an upper surface of the light guide 2, to be described later, the light guide 2 and the light scattering guide 5 are separately illustrated in FIG. 6 and FIG. 7 (Also in FIGS. 9 through 14, they are separately illustrated in the same way). The LED 21 is placed in such a way that a center of the LED 21 is located just a little lower than a double focal point "F" where a focal point of the input lens 3 and a focal point of the parabolic curve of the mirror member 22 exist together. For an easy understanding, the LED 21 in FIG. 6 and FIG. 7 is so illustrated intentionally as if its center is located to be fairly distant from the double focal point "F". Light emitted from the LED 21 is diverging light, and after entering the input lens 3, the light becomes nearly parallel light due to the effect of the convex lens. Light, which enters the input lens 3 directly from the LED 21, are once radiated onto the light exit surface 6 of the light guide 2 (i.e., the upper surface) in FIG. 6. Then, after being totally reflected by the light exit surface 6, the light is changed for their traveling directions mainly by the prism part 4 located at the center area of the light guide 2. The light changed for their traveling directions passes through the light exit surface 6 in a direction almost perpendicular to the surface; and then after being scattered in and passing though the light scattering guide 5, the light is output. Eventually, the light shown in FIG. 6 is mainly output from the center area of the light guide 2. As a result, though in general the light output from a center area of a light guiding member becomes weak and a variation in the intensity distribution of the output light is likely to become significant, in the case of the light guiding member 1 according to the present embodiment the light output from the center area becomes strong and a variation in the intensity distribution becomes gentle.

Regarding light emitted from the LED 21, reflected by the mirror member 22 and entering the input lens 3, some of the light is once totally reflected by the light exit surface 6 and then travel along light paths similar to those shown in FIG. 6. Meanwhile, as shown in FIG. 7, the other of the light is directly radiated onto the prism part 4, without being totally reflected by the light exit surface 6, so as to be changed for their traveling directions. Then, the light pass through the light exit surface 6 in a direction almost perpendicular to the surface, and after being scattered in and passing though the light scattering guide 5, the light is output. The light shown in FIG. 7 is mainly output from both the end areas of the light guide 2.

Figure 8:
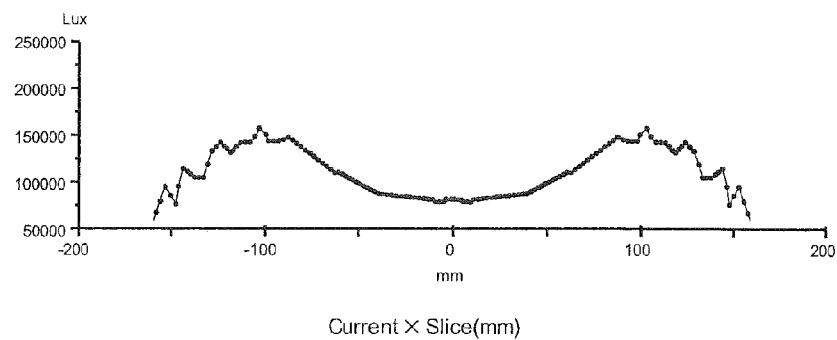
FIG. 8 is a graph showing lighting conditions of the light emitting device according to the embodiment of the present invention, wherein a horizontal axis represents a distance from a center of the light guide, and the graph shows a brightness distribution (light intensity distribution) in the light guide.

FIG. 8 shows a brightness distribution (light intensity distribution) in the light guide 2 with a result of simulation, wherein a horizontal axis represents a distance from a center of the light guide 2. Conditions for the simulation are: a light emitting surface of the LED 21 is sized to be a 1 mm square; a brightness of the LED 21 is 150 lumen/piece; a light diffusion angle is 160 degrees; and a point of brightness measurement is located 10 mm away from a top of one surface of the light scattering guide 5, being opposite to the other surface that faces the light exit surface 6 (The same conditions are also applied to cases of FIG. 12, FIG. 15, FIG. 18, FIG. 19, and FIG. 20). A top surface of the light scattering guide 5 shown in FIG. 2 swells from both ends in the width-wise direction toward a center part of the top surface, and therefore it works as a convex lens. Accordingly, light output from the light scattering guide 5 is gathered at a position that is distant for a predetermined distance from the light scattering guide 5. If a piece of paper (such as paper for use of an image scanner) is placed at the position, there appears a luminous line, being parallel to the optical axis M1, on the paper. Incidentally, since the light scattering guide 5 contains the light scattering particles, the output light is scattered somewhat. Therefore, the luminous line appears as a continuous straight line without any break. Furthermore, as shown in FIG. 8, the amount of output light at the center area is less than the amount at both the end areas of the light guide 2. This is because, though the amount of light guided to the center area is made to be greater as shown in FIG. 6, there still exist other light that travels along the light paths as shown in FIG. 7, and those light paths are short enough to make the light intensity great. In the present embodiment, the amount of output light at the center area is less than the amount at both the end areas, however the degree of less amount of output light there is less significant in comparison with a case where the LED 21 is positioned on the optical axis M1 without any tilt of posture. In other words, the light intensity at the center area comes closer to the light intensity at both the end areas.

Figure 9:
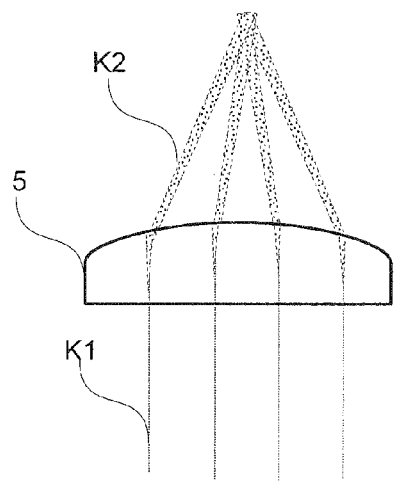
FIG. 9 is a drawing that shows paths of light passing through the light scattering guide shown in FIG. 2.

FIG. 9 shows light paths inside and outside the light scattering guide 5 shown in FIG. 2. As light introduced along a light path K1 from the light guide 2 passes through the light scattering guide 5, the light is scattered gradually. When being output from the top of the light scattering guide 5 shaped like a convex lens, the light is refracted toward the center in the width-wise direction of the light scattering guide 5. Then, as the light is further scattered, the light path K1 changes into light path K2 having a gradually widening radiation area. Since other light paths also undergo the same process, there is formed a linear luminous area having a predetermined width at a position that is distant for a predetermined distance from the top of the light scattering guide 5.

(Advantageous Effect Achieved by the Embodiment of the Present Invention)

The light emitting device 20 and the light guiding member 1 have the input lens 3 for making input light nearly parallel light. Then, the nearly parallel light directly arrives at the prism part 4 positioned around a center area, or arrives there after once being totally reflected by the light exit surface 6; and then the light is reflected or totally reflected there, and output. In these steps, if the input light enters in a slantwise upward direction from a position lower than the optical axis M1 of the input lens 3, the light is once totally reflected by the light exit surface 6 and it becomes possible to increase the amount of output light that has been reflected or totally reflected by the prism part 4 positioned around the center area. Therefore, in comparison with a conventional case, the amount of light output from the center area 1 of the light guiding member 1 increases, and it becomes possible to prevent the intensity distribution of the output light from having a significant variation. Furthermore, the light is not fully-parallel light but nearly parallel light, and therefore the light reflected by the same saw tooth travels toward the light exit surface 6 while having a certain width. Therefore, it becomes possible to prevent an area with a less amount of reflected light from appearing within light reflected by neighboring saw teeth, and eventually to prevent the output light from having a stripe pattern in the intensity distribution. When diffusion light emitted from the LED 21 supposedly enters the light guide 2 as it is, both the end areas of the light guiding member 1 have an area with a much amount of output light so that a significant variation is likely to appear in the intensity distribution of the output light. Furthermore, there appears some light that passes through the prism part 4, and it causes a significant variation in the intensity distribution. In order to prevent such light from passing through the prism part 4, it is required to place the prism part 4 in extremely high density and furthermore to have the prism part 4 formed so as to be tilted with respect to the light exit surface 6. In the meantime, the light emitting device 20 is structured in such a way that the light enters in a slantwise upward direction from a position lower than the optical axis M1 of the input lens 3. Accordingly, the prism part 4 can be placed in parallel with the light exit surface 6, and it is not necessary to tilt the prism part 4 with respect to the light exit surface 6 even though it is required in the case of a conventional structure. Therefore, it becomes possible to avoid difficulties in manufacturing work as well as assembling work, such as difficulty in horizontal placement.

Furthermore in the light emitting device 20, the mirror member 22 reflects a part of the light emitted from the LED 21, which does not directly enter the input lens 3 and the light guide 2, so as to make the reflected light enter the input lens 3 and the light guide 2. Therefore, most of the light emitted from the LED 21 can enter the light guiding member 1.

Meanwhile, the light emitting device 20 and the light guiding member 1 contain the light scattering particles for the light scattering guide 5 to scatter light multiply. Since the light scattering guide 5 is expected to carry out light scattering operation in which frontward scattering is significant, preferably there should not appear a decrease in the light emitting efficiency. Furthermore, the light guide 2 and the input lens 3 are made of transparent materials, or they include the light scattering guide 5 for greatly increasing the turbidity "$\tau$." Therefore, before being output from the light exit surface 6, almost no light has been scattered, and most of the light scattering occurs when the light is output from the light scattering guide 5. Accordingly, even if there exists somewhat a stripe pattern in the intensity distribution as described above at the time when the light is output from the light exit surface 6, the stripe pattern in the intensity distribution can be controlled through multiple-scattering of the light by the light scattering guide 5 without much of a decrease in the light emitting efficiency.

In the meantime, the light scattering particles contained in the light scattering guide 5 have turbidity expressed as "$\tau$" (unit: in centimeters), which is a scattering parameter corresponding to a scattering coefficient of the light scattering guide 5, within a range of "$1 < T/\tau < 10$", wherein T (unit: in centimeters) is a maximum thickness (H2) of the light scattering guide 5 in a direction perpendicular to the light exit surface 6. Making the value of "$T/\tau$" greater than 1 enables further control on an appearance of the stripe pattern in the intensity distribution described above. On the other hand, making the value of "$T/\tau$" smaller than 10 suppresses multiple-scattering of the light excessively so that, as shown in FIG. 9, a linear luminous area having a predetermined width can easily be formed.

Furthermore, in the light emitting device 20, the amount of output light is less at the center area than at both the end areas of the light guide 2. Then, the output light is collected at a position, which is distant for a predetermined distance from the light scattering guide 5, to make up a linear luminous area. Therefore, the light emitting device 20 is suitable as a light source for an image scanner, in which an object of image scanning is placed at the position of the predetermined distance, and an image is formed with the reflected light from the object by using an image pickup device located at a position distant for a predefined distance from the center area of the light guide 2 in a direction perpendicular to the length-wise direction of the light guide 2. The reason is that both the end areas of the light guide 2 are more distant from the image pickup device than the center area is, so as to have a long light path; moreover, their radiating direction is slanted with a great angle of view from the light guide 2; accordingly, the light cannot easily reach the image pickup device according to the cosine fourth law; and therefore, from the viewpoint of the image pickup device, when a great amount of light comes from both the end areas, the center area and both the end areas of the light guide 2 come to have nearly the same amount of light.

The light emitting device 20 is also suitable as another type of light source for an image scanner, in which an image pickup device of the scanner moves within a range of the length of the light guide 2 in its length-wise direction, and the image pickup device captures the light reflected from the object described above while facing the center area as well as both the end areas of the light guide 2. The reason is that, according to the cosine fourth law, both the end areas of the light guide 2 include the light within a range having a wide angle of view, while the range exceeding a motion range of the image pickup device, namely the light being not captured by the image pickup device and just radiated wastefully, so as to likely result in a lack of light; and, from the viewpoint of the image pickup device, the center area and both the end areas of the light guide 2 come to have nearly the same amount of light. When used is a image pickup device being linear and parallel to the light guide 2, both the end areas likely have insufficient incoming light. In the mean time, if both the end areas have a lot of light as those of the light emitting device 20 have, such a bad effect does not come up.

Placement of the LED 21 at a position closer to the light exit surface 6 can make both the end areas of the light guide 2 lighted stronger. Meanwhile, placement of the LED 21 at a position closer to the prism part 4 can make the center area of the light guide 2 lighted stronger; and even in that case, the center area still does not become so luminous as both the end areas are. Moreover, tilting the LED 21 so as to supply the mirror member 22 with a lot of light can make neighboring sections to both the end areas of the light guide 2 lighted stronger. These issues are described below from other viewpoints.

In order to adjust the amount of light to be output from the center area and both the end areas of the light guide 2, the position of the LED 21 shown in FIG. 5 are controlled in a vertical direction (the degree of displacement) and/or the tilt of the same (the degree of slant). With respect to the light emitted from the LED 21, if the amount of light traveling in a slantwise upward direction from a lower side or in a slantwise downward direction from a higher side is increased at the time when the light enters the light guide 2, the amount of light radiated onto the prism part 4 at both the end areas of the light guide 2 becomes increased. As a result, the amount of light output from both the end areas of the light guide 2 becomes much more than the light output from the center area so that the light at the end areas becomes significantly strong. To the contrary, with respect to the light emitted from the LED 21; if the amount of light traveling either in a slantwise downward direction from a higher side or in a slantwise upward direction from a lower side is decreased while the amount of light traveling toward the center area of the light guide 2 is increased at the time when the light enters the light guide 2, the amount of light radiated onto the prism part 4 at the center area of the light guide 2 becomes increased. As a result, the amount of light output from the center area of the light guide 2 becomes increased. Meanwhile, even in that case, in consideration of the length of light paths and the LED 21 structured as a surface light source, the light intensity of both the end areas is still greater than that of the center area. In other words, though the light intensity tends to become uniform in the length-wise direction, it is still weaker at the center area.

Furthermore in the light emitting device 20 and the light guiding member 1, the light guide 2 and the light scattering guide 5 are formed molded together into a single piece through molding of two component materials. Therefore, both the two members can be handled as a single unit so that such a construction enables excellent handling performance.

Moreover, in the light emitting device 20, both the ends of the light guide 2 are each equipped with one LED 21 and one input lens 3. Therefore, a minimal light source including only two LEDs 21 works, and thus given are cost-wise advantages of a reduced number of components, lower power consumption, and so on. In the light emitting device 20 and the light guiding member 1, the light comes in from both the ends of the light guide 2 in its length-wise direction; the prism part 4 is so formed as to have a sawtooth-like cross-sectional view including a plurality of saw teeth; and in the light guide 2, the peak-to-peak pitch P1 of the saw teeth at the center area is made to be longer than the peak-to-peak pitch P2 of the saw teeth at both the end areas. This is because an incident angle of light onto the prism part 4 is small at the center area of the light guide 2, which is distant from the LED 21, so that the radiated light can almost certainly be changed for its traveling direction even though a value of the pitch P1 is made to be great. Eventually, the shape of the center area of the light guide 2 does not become complicated, and therefore the dimension accuracy in molding by a metal mold and the like can be improved.

(First Modification)

Figure 10:
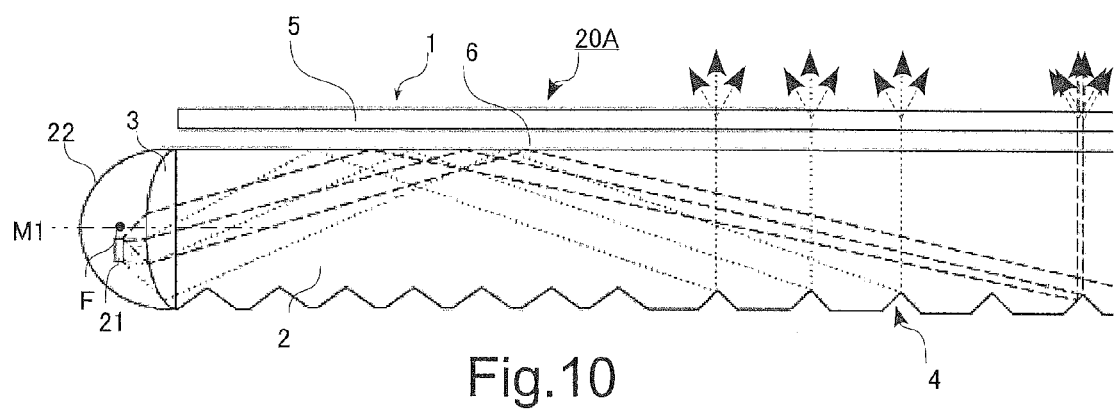
FIG. 10 is a drawing that shows situations of light input and light output under conditions where an LED of a light emitting device of a first modification of the light emitting device according to the embodiment of the present invention is turned on; namely it is a schematic view showing paths of light, emitted from both ends of the LED so as to directly enter an input lens, wherein the LED is shifted toward the prism part and not tilted.
Figure 11:
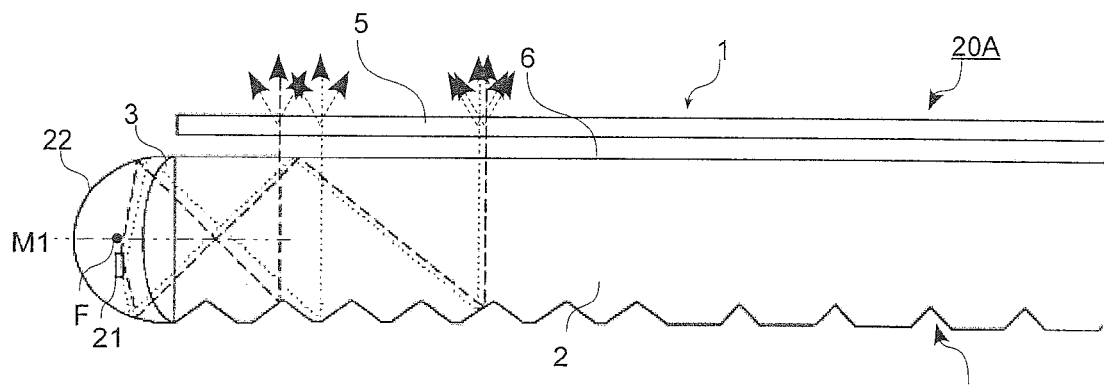
FIG. 11 is a drawing that shows situations of light input and light output under conditions where the LED of the light emitting device of the first modification of the light emitting device according to the embodiment of the present invention is turned on; namely it is a schematic view showing paths of light, launched from both ends of the LED so as to be once reflected by a mirror member and then enter the input lens, wherein the LED is shifted toward the prism part and not tilted.

FIG. 10 and FIG. 11 are schematic drawings that show situations of light input and light output under conditions where an LED 21 of a light emitting device 20A of a first modification of the light emitting device 20 is turned on. In the light emitting device 20A shown in the longitudinal cross-section view of FIG. 10, except one point that the LED 21 having no tilt is displaced to a lower side with respect to an axis of the light guide 2, namely the optical axis M1, applied is the same structure as it is in the light emitting device 20. Therefore, an explanation is made while the same reference numeral is used for a component as it is given to each corresponding component of the light emitting device 20. FIG. 10 shows a case where the light enters the input lens 3 directly from the LED 21, and the drawing shows paths of light emitted from both ends of the LED 21. In the meantime, FIG. 11 shows a case where the light from the LED 21 is once reflected by the mirror member 22, and then enters the input lens 3, and the drawing shows paths of light emitted from both ends of the LED 21. Fine dotted arrowed lines show paths of the light emitted from a lower side area of the LED 21 shown in FIG. 10 and FIG. 11. On the other hand, rough broken arrowed lines show paths of the light emitted from a higher side area of the LED 21 shown in FIG. 10 and FIG. 11.

Though the light emitted from the LED 21 is diffusion light, the light passed through the input lens 3 is nearly parallel light. Then, the LED 21 is shifted downward to a position lower than the optical axis M1 of the input lens 3. Therefore, when light enters the input lens 3 having a hyperbolic curve shape as shown in FIG. 10, most of the light directing perpendicular to the light emitting surface is refracted upward. Then, the light is totally reflected by the light exit surface 6 of the light guide 2, and subsequently changed for their traveling directions mainly by the prism part 4 of the center area of the light guide 2. Then, the light passes through the light exit surface 6 almost in a perpendicular direction, and furthermore passes through the light scattering guide 5 to be finally output there. As shown in FIG. 10, light emitted from the higher side area of the LED 21 principally travels toward the center area of the light guiding section 2, and after being reflected by the prism 4, the light is output from the center area of the light guiding section 2; and meanwhile light emitted from the lower side area of the LED 21 is principally output from a part that is somewhat away from the center area of the light guiding section 2 and close toward a corresponding one of both the end areas.

The light reflected by the mirror member 22 and entering the input lens 3 shown in FIG. 11 is that coming from both the end areas among the light emitted from the LED 21 in a very wide angular range. Since the LED 21 has a directional characteristic in a frontward direction, the amount of light coming from both the end areas is just a little. Thus, among the light emitted in such a wide angular range, light emitted in an upward direction is reflected by the mirror member 22 so as to pass through the input lens 3, and are radiated to the prism part 4 without a total reflection by the light exit surface 6. Then, being changed for their traveling directions there, the light passes through the light exit surface 6 almost in a perpendicular direction, and further passes through the light scattering guide 5 to be finally output there. On the other hand, the light emitted in a downward direction are reflected by the mirror member 22 so as to pass through the input lens 3, and subsequently the light is reflected by the light exit surface 6 to travel toward the prism part 4. Then, the light is reflected by the prism part 4 toward the light exit surface 6. Thus, the light shown in FIG. 11 is mainly output from both the end areas of the light guide 2.

Figure 12:
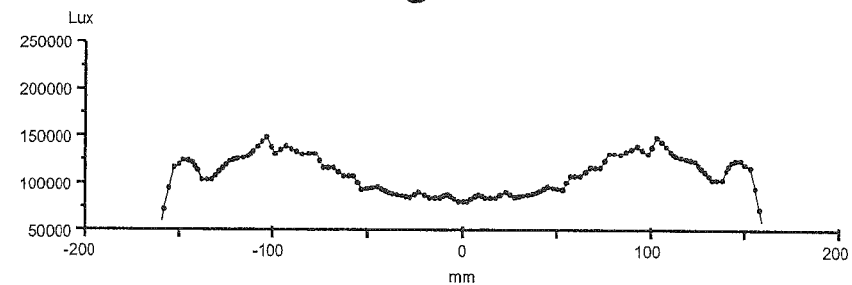
FIG. 12 is a graph showing lighting conditions of the first modification of the light emitting device according to the embodiment of the present invention, wherein a horizontal axis represents a distance from the center of the light guide, and the graph shows a brightness distribution (light intensity distribution) in the light guide.

FIG. 12 is a graph showing lighting conditions of the light emitting device 20A, wherein a horizontal axis represents a distance from the center of the light guide 2, and the graph shows a brightness distribution (light intensity distribution) in the light guide 2. Being compared to a case where the light emitting surface of the LED 21 is so placed as to be perpendicular to the optical axis M1, and a center of the LED 21 is located at the double focal point "F"; in the lighting conditions of the light emitting device 20A, the amount of light reflected by the prism part 4 is increased and the light intensity is slightly weakened at both the end areas so that a difference in the light intensity between both the end areas and the center area becomes reduced. In other words, if the center of the LED 21 is so placed as to meet the optical axis M1, parallel light leak out through the opposite end so that the light efficiency is reduced, and the total amount of light output from the light exit surface 6 becomes decreased. For the light output from the light emitting device 20A, the amount of light output from the center area is less than that from both the end areas of the light guide 2 in the same way as for the light emitting device 20. Meanwhile, as described above, the amount of light output from both the end areas of the light guide 2 in this case is somewhat less than that of the light emitting device 20.

(Second Modification)

Figure 13:
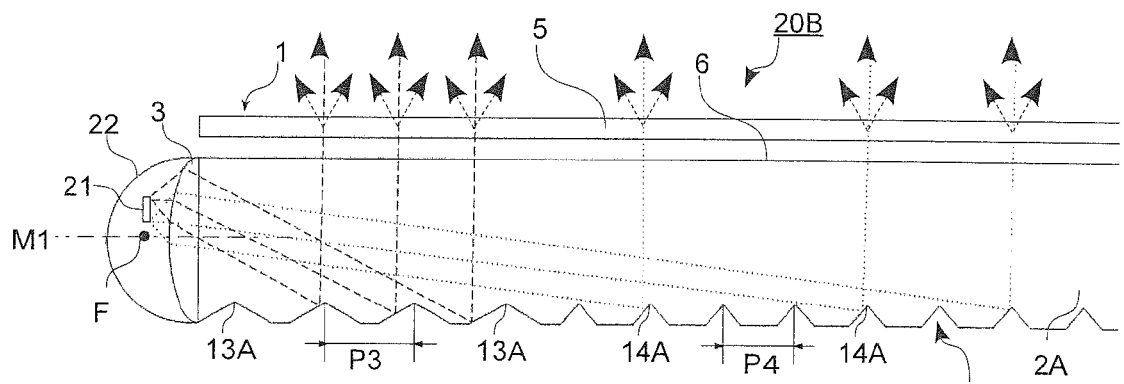
FIG. 13 is a drawing that shows situations of light input and light output under conditions where an LED of a light emitting device of a second modification of the light emitting device according to the embodiment of the present invention is turned on; namely it is a schematic view showing paths of light, emitted from both ends of the LED so as to directly enter an input lens, wherein the LED is shifted toward a light exit surface and not tilted.
Figure 14:
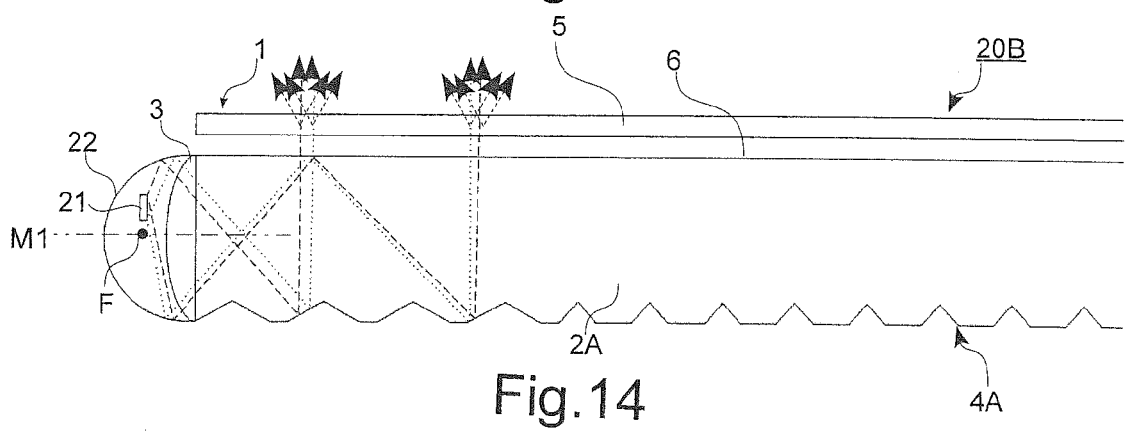
FIG. 14 is a drawing that shows situations of light input and light output under conditions where the LED of the light emitting device of the second modification of the light emitting device according to the embodiment of the present invention is turned on; namely it is a schematic view showing paths of light, emitted from both ends of the LED so as to be once reflected by a mirror member and then enter the input lens, wherein the LED is shifted toward the light exit surface and not tilted.

FIG. 13 and FIG. 14 are schematic drawings that show situations of light input and light output under conditions where an LED 21 of a light emitting device 20B of a second modification of the light emitting device 20 is turned on. In the light emitting device 20B, the LED 21 having no tilt has its light emitting surface oriented perpendicular to the axis of the light guide 2, namely the optical axis M1, and the LED 21 is shifted upward to a position higher than the optical axis M1 of the input lens 3. As a result of the displacement, the LED 21 comes to be located at an intermediate point between the optical axis M1 and the light exit surface 6. In a prism part 4A of a light guide 2A, a peak-to-peak pitch P3 of depression parts 14A at a center area of the light guide 2A is made to be longer than a peak-to-peak pitch P4 of depression parts 13A at both end areas of the light guide 2A. A prism angle in a range of the peak-to-peak pitch P3 is 30 degrees at each position, and meanwhile a prism angle in a range of the peak-to-peak pitch P4 is 40 degrees at each position. Except these points described above, applied is the same structure as it is in the light emitting device 20. Therefore, an explanation is made while the same reference numeral is used for a component as it is given to each corresponding component of the light emitting device 20.

FIG. 13 shows a case where the light enters the input lens 3 directly from the LED 21, and the drawing shows paths of light emitted from both ends of the LED 21. In the meantime, FIG. 14 shows a case where the light from the LED 21 is once reflected by the mirror member 22, and then enters the input lens 3, and the drawing shows paths of light emitted from both ends of the LED 21. Fine dotted arrowed lines show paths of the light emitted from a lower side area of the LED 21 shown in FIG. 13 and FIG. 14. On the other hand, rough broken arrowed lines show paths of the light emitted from a higher side area of the LED 21 shown in FIG. 13 and FIG. 14.

Though the light emitted from the LED 21 is diffusion light, the light passed through the input lens 3 is nearly parallel light. Then, the LED 21 is shifted upward to a position higher than the optical axis M1 of the input lens 3. Therefore, when light enters the input lens 3 having a hyperbolic curve form as shown in FIG. 13, most of the light directing perpendicular to the light emitting surface is refracted downward. Then, the light is changed for the traveling direction by the prism part 4 of the center area as well as both the end areas of the light guide 2. Subsequently, the light passes through the light exit surface 6 almost in a perpendicular direction, and furthermore passes through the light scattering guide 5 to be finally output there. As shown in FIG. 13, light emitted from the higher side area of the LED 21 is principally output from both the end areas of the light guide 2; and meanwhile light emitted from the lower side area of the LED 21 principally travels toward the center area of the light guide 2, and after being reflected by the prism part 4, the light is output from the center area of the light guide 2.

The light reflected by the mirror member 22 and entering the input lens 3 shown in FIG. 14 is that emitted from the LED 21 in a very wide angular range. Among the light, light emitted in a downward direction is totally reflected by the light exit surface 6, and subsequently reflected by the prism part 4A to pass through the light exit surface 6. On the other hand, light emitted in an upward direction is reflected by the mirror member 22 so as to pass through the input lens 3, without being totally reflected by the light exit surface 6; and are directly radiated onto the prism part 4A. Subsequently, being changed for their traveling directions there, the light passes through the light exit surface 6 almost in a perpendicular direction. Then, all the light further passes through the light scattering guide 5 to be finally output there. The light shown in FIG. 14 is principally output from both the end areas of the light guide 2A. Incidentally, with a value of the pitch P3 made to be greater than that of the pitch P4, a shape of both the end areas of the light guide 2A, from which light is principally output, does not become complicated. Therefore, the dimension accuracy in shaping a mold and the like can be improved.

Figure 15:
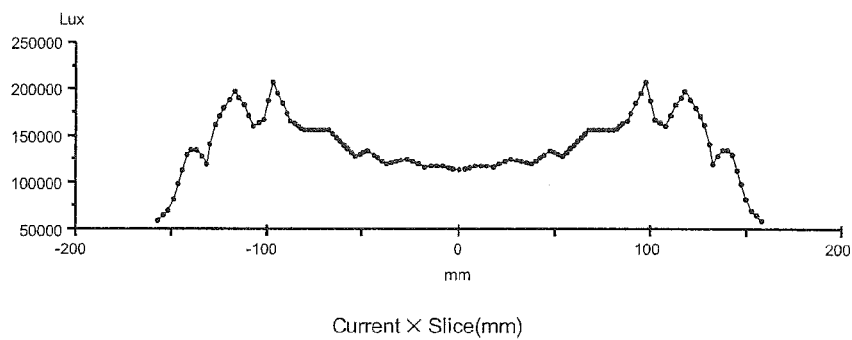
FIG. 15 is a graph showing lighting conditions of the second modification of the light emitting device according to the embodiment of the present invention, wherein a horizontal axis represents a distance from the center of the light guide, and the graph shows a brightness distribution (light intensity distribution) in the light guide.

FIG. 15 is a graph showing lighting conditions of the light emitting device 20B, wherein a horizontal axis represents a distance from the center of the light guide 2, and the graph shows a brightness distribution (light intensity distribution) in the light guide 2. The lighting conditions of the light emitting device 20B are almost the same as those of the light emitting device 20 and the light emitting device 20A, from the viewpoint that both the end areas are bright and the center area is dark. Meanwhile, the amount of light output from both the end areas of the light guide 2A is more than those of the light emitting device 20 and the light emitting device 20A. The light output from both the end areas in plenty is output from positions that are somewhat distant from the LED 21, being compared to cases of the light emitting device 20 and the light emitting device 20A.

(Third Modification)

Figure 16:
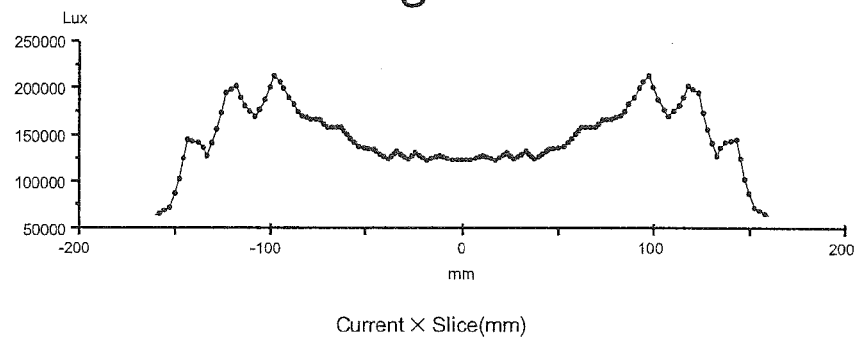
FIG. 16 is a graph showing lighting conditions of a light emitting device of a third modification of the light emitting device according to the embodiment of the present invention, wherein a horizontal axis represents a distance from a center of a light guide, and the graph shows a brightness distribution (light intensity distribution) in the light guide.

FIG. 16 is a graph showing lighting conditions of a light emitting device 20C (not illustrated) of a third modification of the light emitting device 20, wherein a horizontal axis represents a distance from the center of the light guide 2, and the graph shows a brightness distribution (light intensity distribution) in the light guide 2. In the light emitting device 20C, a light emitting surface is oriented perpendicular to the axis of the light guide 2, namely the optical axis M1, and the LED 21 is shifted upward to a position higher than the optical axis M1 of the input lens 3. As a result of the displacement, the LED 21 comes to be located at an intermediate point between the optical axis M1 and the light exit surface 6. Then, the LED 21 is tilted toward the prism part 4A (downward) at 45 degrees. Furthermore, the light emitting device 20C uses the light guide 2A including the prism part 4A in the same way as the light emitting device 20B does. Except these points described above, the light emitting device 20C has the same structure as the light emitting device 20. The lighting conditions of the light emitting device 20C are almost the same as those of the light emitting devices 20, 20A, and 20B, from the viewpoint that both the end areas are bright and the center area is dark. Then, the amount of light output from both the end areas of the light guide 2A is equivalent to that of the light emitting device 20B. The light output from both the end areas in plenty is emitted from almost the same positions as in the light emitting device 20B.

Comparative Example

Figure 17:
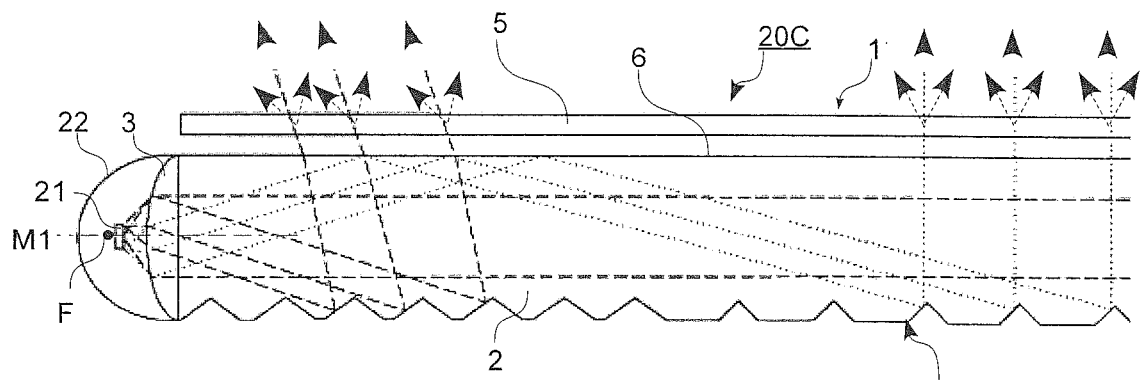
FIG. 17 is a drawing that shows situations of light input and light output under conditions where an LED of the light emitting device of the third modification of the light emitting device according to the embodiment of the present invention is turned on; namely it is a schematic view showing paths of light, emitted from both ends of the LED so as to directly enter an input lens, wherein the LED is neither shifted nor tilted.
Figure 18:
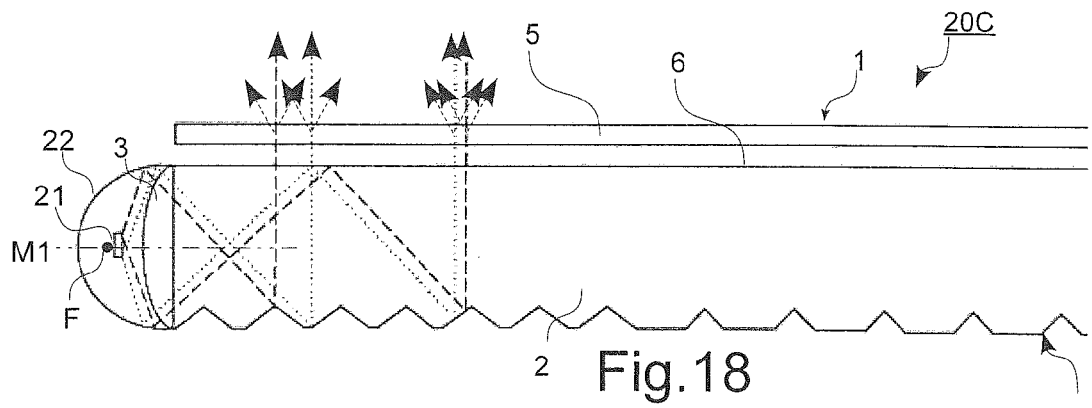
FIG. 18 is a drawing that shows situations of light input and light output under conditions where the LED of the light emitting device of the third modification of the light emitting device according to the embodiment of the present invention is turned on; namely it is a schematic view showing paths of light, emitted from both ends of the LED so as to be once reflected by a mirror member and then enter the input lens, wherein the LED is neither shifted nor tilted.

FIG. 17 and FIG. 18 are schematic drawings that show situations of light input and light output under conditions where an LED 21 of a light emitting device 20D of a comparative example is turned on. In the light emitting device 20D, the LED 21 having no tilt has its light emitting surface oriented perpendicular to the axis of the light guide 2, namely the optical axis M1, and a center of the LED 21 is located at the double focal point "F." Except these points described above, applied is the same structure as it is in the light emitting device 20. Therefore, an explanation is made while the same reference numeral is used for a component as it is given to each corresponding component of the light emitting device 20. FIG. 17 shows a case where the light enters the input lens 3 directly from the LED 21, and the drawing shows paths of light emitted from both ends of the LED 21. In the meantime, FIG. 18 shows a case where the light from the LED 21 is once reflected by the mirror member 22, and then enters the input lens 3, and the drawing shows paths of light emitted from both ends of the LED 21. Fine dotted arrowed lines show paths of the light output from a lower side area of the LED 21 shown in FIG. 17 and FIG. 18. On the other hand, rough broken arrowed lines show paths of the light output from a higher side area of the LED 21 shown in FIG. 17 and FIG. 18.

Though the light emitted from the LED 21 is diffusion light, the light output from the input lens 3 becomes nearly parallel light. Meanwhile, the center of the LED 21 is located at the focal point of the input lens 3, i.e., the double focal point "F"; and therefore when light enters the input lens 3 having a hyperbolic curve form as shown in FIG. 17, most of the light emitted from the lower side area of the LED 21 is refracted upward. Then, the light is totally reflected by the light exit surface 6 of the light guide 2, and subsequently changed for their traveling directions mainly by the prism part 4 of the center area of the light guide 2. Then, the light passes through the light exit surface 6 almost in a perpendicular direction, and furthermore passes through the light scattering guide 5 to be finally output there. Meanwhile, most of the light emitted from the higher side area of the LED 21 is refracted downward. Then, the light is changed for its traveling directions at somewhat sharp angles by the prism part 4 of both the end areas of the light guide 2. Then, the light passes through the light exit surface 6, and furthermore passes through the light scattering guide 5 to be finally output there. In the meantime, light emitted from the LED 21 in a relatively wide angular range is not radiated onto the prism part 4, but travels in a straight line through the light guide 2 in the length-wise direction. Some of the light traveling in such a straight line is partly reflected by the mirror member 22 at the opposite side so as to enter the light guide 2 again, and finally passes through the light scattering guide 5 to be output there. Among the light shown in FIG. 17, light emitted from the higher side area of the LED 21 is principally output from both the end areas of the light guide 2; and meanwhile light emitted from the lower side area of the LED 21 is mainly output from the center area of the light guide 2. Incidentally, since light emitted from the center of the LED 21 turn into parallel light, there exists quite a few light that travels from one end to the other end. As a result, the light efficiency of the light emitting device 20D is reduced, being compared to those of the light emitting devices 20, 20A, 20B, and 20C.

The light reflected by the mirror member 22 and entering the input lens 3 shown in FIG. 18 is that emitted from the LED 21 in a very wide angular range. After being reflected by the mirror member 22, the light travels along almost the same light paths as shown in FIG. 17. The light shown in FIG. 18 is principally output from both the end areas of the light guide 2.

Figure 19:
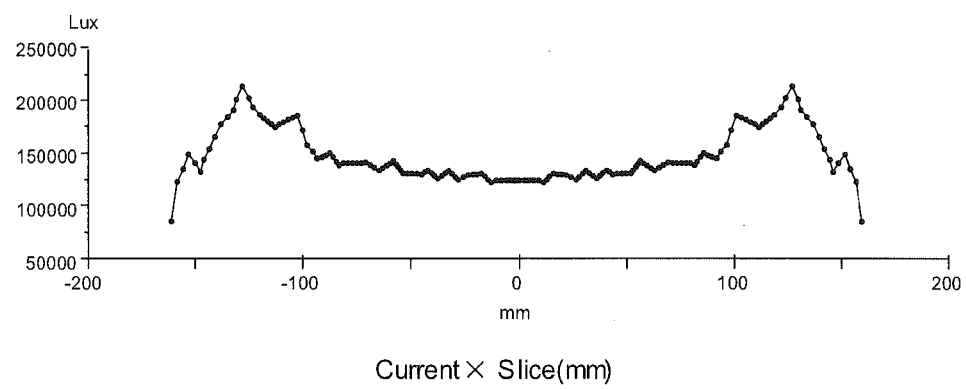
FIG. 19 is a graph showing lighting conditions of a comparative example of the light emitting device, wherein a horizontal axis represents a distance from a center of a light guide, and the graph shows a brightness distribution (light intensity distribution) in the light guide.

FIG. 19 is a graph showing lighting conditions of the light emitting device 20D, wherein a horizontal axis represents a distance from the center of the light guide 2, and the graph shows a brightness distribution (light intensity distribution) in the light guide 2. The lighting conditions of the light emitting device 20D are almost the same as those of the light emitting devices 20, 20A, 20B, and 20C, from the viewpoint that the amount of light output from the center area is less than that from both the end areas, in the light guide 2. In the meantime, with respect to a difference in the amount of light between both the end areas and the center area, the difference in the light emitting device 20D is greater than that in the light emitting devices 20 and 20A; and it is smaller than that in the light emitting devices 20B and 20C. Furthermore, in the case of the light emitting device 20D, there exist a lot of ripples in the light intensity around the center area.

Figure 20:
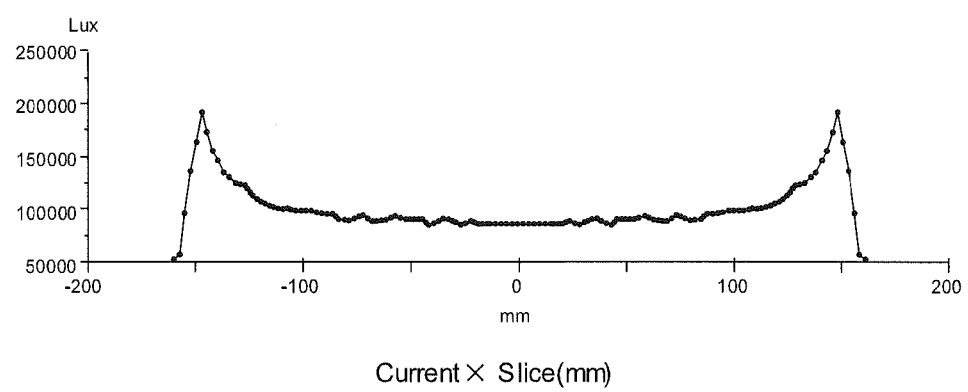
FIG. 20 is a graph showing lighting conditions of a light emitting device having no input lens, wherein a horizontal axis represents a distance from a center of a light guide, and the graph shows a brightness distribution (light intensity distribution) in the light guide.

FIG. 20 is a graph showing lighting conditions of a light emitting device having no input lens, wherein the LED 21 is placed in the same way as it is in the light emitting device 20D. As shown in FIG. 20, if there is no input lens, the center area becomes extremely dark. Furthermore, a difference in the amount of light between both the end areas and the center area becomes extremely great. Then, when such lighting conditions described above are required, the input lens 3 may be removed. As an alternative solution, at least either one of shifting the lens and tilting the lens may be adopted instead of removing the input lens.

(Other Modifications)

Besides the above explanation with regard to the optical element (the light guiding member 1) and the light emitting devices 20, 20A, 20B and 20C according to the embodiment of the present invention, various other modifications may be made without changing the concept of the present invention.

The light emitting device 20, 20A, 20B or 20C according to the embodiment of the present invention includes: the rod-shaped light guide 2 or 2A; the LED 21 which inputs light to the light guide 2 or 2A; and the prism part 4 or 4A which changes the direction of light input from the lengthwise end of the light guide 2 or 2A, and emits redirected light from a light exit surface 6 that is disposed opposite the prism part 4 or 4A, in which the input lens 3 as a parallel light forming body, which makes light emitted from the LED 21 toward the light guide 2 or 2A nearly parallel light, is formed at the lengthwise end of the light guide 2 or 2A; and the LED 21 is shifted from the center axis of the light guide 2 or 2A toward the side closer to the prism part 4 or 4A, or toward the side away from the prism part 4 or 4A, for the nearly parallel light to be directed to the light exit surface 6 of the light guide 2 or 2A or to the prism part 4 or 4A. On this occasion, though the prism part 4 or 4A is so placed as to be in parallel with the light exit surface 6, it is not necessarily required to have such an arrangement. For example, the prism part 4 or 4A without being in parallel with the light exit surface 6 may be so tilted as to come closer toward the light exit surface 6 as being more distant from the LED 21. Furthermore, for changing the traveling direction of light, another light reflecting member such as a mirror, a white-surface, or the like may be used instead of the prism part 4 or 4A.

The prism part 4 or 4A and/or the light exit surface 6 may be not shaped as a plane but as a curved surface or the like. For example, the light exit surface 6 may be shaped as a part of a circumferential wall of a circular column, in the same way as the top surface of the light scattering guide 5 is. Moreover, though a component made of PMMA is used as the light guide 2 or 2A, alternatively as a material for this component, any other transparent resin material, glass, or the like may be used; such as acrylic resin, polystyrene, polycarbonate, and so on, which are polymer materials of acrylic acid ester, or methacrylate ester, and highly transparent amorphous synthetic resins. Meanwhile, the input lens 3 materialized with a convex lens is used as a parallel light forming body in this case. If the LED 21 is placed so as to face in a direction opposite from the light guiding member 1, the mirror member 22 may work as a parallel light forming body. Thus, a concave mirror may be used as a parallel light forming body as described above.

The light emitting device 20, 20A, 20B or 20C according to the embodiment of the present invention includes the mirror member 22 which is placed around the LED 21 and makes light which does not enter the input lens 3 directly from the LED 21 input to the input lens 3. Alternatively, the mirror member 22 can be omitted, since it is not an indispensable constituent component. In this regard, it is still preferable, from a viewpoint of effectively using light emitted from the LED 21, that each of the light emitting devices 20, 20A, 20B and 20C includes the mirror member 22. Moreover, even in the case of the light emitting devices 20, 20A, 20B or 20C including the mirror member 22, it is not required for the mirror member 22 to have a cup-shaped form with a parabolic curve in its longitudinal cross-section view shown in FIG. 5, and the mirror member 22 may be shaped with another form, such as a spherical curve. Furthermore, the reflecting member may be not a mirror part such as the mirror member 22 but may be a member having a light reflecting surface, such as a white-surface, and the like.

The input lens 3 used as the parallel light forming body for producing parallel light in the light emitting device 20, 20A, 20B or 20C according to the embodiment of the present invention is convex at a side facing the LED 21. Then, the LED 21 used in the light emitting device 20 or 20A is shifted in a direction for coming close to the prism parts 4 and 4A from the optical axis M1 of the input lens 3. Alternatively, the LED 21 may be shifted in a direction for leaving from the prism part 4 or 4A, still with respect to the optical axis M1 of the input lens 3. Furthermore, the input lens 3 may be omitted, since it is not an indispensable constituent component. Instead of the input lens 3, for example, a concave mirror and the like as described above may be used as a parallel light forming body. Such a concave mirror is able to reflect diffusion light emitted from the LED 21 and make the e reflected light nearly parallel light. Moreover, even when a convex lens is used as a parallel light forming body, it is not an indispensable condition that the convex lens has a hyperbolic curve in its cross-section view in the same way as the input lens 3 has.

The LED 21 used in the light emitting device 20, 20A, 20B or 20C according to the embodiment of the present invention is so placed as to have its light emitting surface tilted with respect to the optical axis M1 of the light guide 2 or 2A. Since such an arrangement of the LED 21 is not an indispensable constituent requirement, it may not be necessarily adopted. Furthermore, even when such an arrangement is adopted, various conditions such as a position, a tilt angle, and the like of the LED 21 may arbitrarily be determined.

On the light exit surface 6 of the light guide 2 or 2A, which is comprised in the optical device (the light guiding member 1) and light emitting device 10, 20A, 20B or 20C, there is provided the light scattering guide 5, which contains light scattering particles for multiple-scattering the light emitted from the LED 21 toward the light guide 2 or 2A. Since the light scattering guide 5 is not an indispensable constituent component, it may be omitted. Furthermore, when the light scattering guide 5 is adopted, various conditions such as a material, a shape, a particle diameter, and the like of the light scattering particles contained in the light scattering guide 5 may arbitrarily be determined. For example, though the light scattering particles are spherical and translucent silicon particles having their particle diameter within a range from 2 to 9 microns in the embodiment, any other kinds of light scattering particles may be used as the light scattering particles, regardless of their material, shape, particle diameter, and the like, as long as they multiple-scatter light in the translucent member 1. Meanwhile, in order to have great enough frontward scattering of input light within an adequate range in the light scattering guide 5, it is preferable to use spherical and translucent silicon particles having their particle diameter within a range from 2 to 9 micrometers, and more preferable to use those within a range from 5 to 9 micrometers.

Since the light scattering particles are not an indispensable constituent component, it may be omitted. Furthermore, the light scattering particles may be contained not in the light scattering guide 5 but in the light guide 2 or 2A as well. Moreover, they may not be contained in the light scattering guide 5 but contained only in the light guide 2 or 2A.

The light scattering particles contained in the light guide 2 or 2A may have turbidity expressed as "$\tau$", which is a scattering parameter corresponding to a scattering coefficient of the light guide 2 or 2A, within a range of "$0<L/(2\times\tau)<30$", wherein "L" is the length of the light guide 2 or 2A in the center axis direction. Having the value of "$L/(2\times\tau)$" greater than 0 makes it possible to multiple-scatter the light that passes through the light guides 2 or 2A, and suitably control the stripe pattern in the intensity distribution described above, under conditions where the light guide 2 or 2A contain the light scattering particles. Meanwhile, having the value of "$L/(2\times\tau)$" smaller than 30 makes it possible to suppress back-scattering of light, and maintain the condition of linear luminous lighting.

The light scattering particles contained in the light scattering guide 5 may have turbidity expressed as "$\tau$", which is a scattering parameter corresponding to a scattering coefficient of the light scattering guide 5, within a range of "$1<T/\tau<10$", wherein T is a maximum thickness of the light scattering guide 5 in a direction perpendicular to the light exit surface 6. Meanwhile, since this restriction is not an indispensable requirement, it is not needed to place the restriction.

In order to obtain appropriate frontward scattering of input light, it is also important to adjust a mean free path of the light that has entered the light guide 2 or 2A, or the light scattering guide 5. For example, where a thickness of the light scattering guide 5 at its center (a maximum thickness) is expressed as "t", the mean free path should preferably be within a range from ¼t to ½t. Having the mean free path longer than ¼t makes it possible to get backscattering not to become excessively large, and to control a drop of the efficiency of output light in comparison with input light. On the other hand, having the mean free path shorter than ½t makes it possible to get the frontward scattering not to become excessively large, and to suitably control the stripe pattern in the intensity distribution described above. The observation described above brings validity especially when spherical and translucent silicon particles with their particle diameter within a range from 2 to 9 micrometers or 5 to 9 micrometers are used as the light scattering particles.

In the light emitting device 20, 20A, 20B or 20C according to the embodiment of the present invention, both the ends of light guide 2 or 2A are each provided with one LED 21 and one input lens 3, and meanwhile the amount of light output from the center area is less than that from both the end areas, in the light guide 2 or 2A. In the case according to the embodiment, the amount of light output from the center area is significantly increased in comparison with a case where the LED 21 is simply placed. Since it is not an indispensable condition that a light intensity distribution has a gentle concave distribution curve achieved by increasing the amount of light output from the center area, such a light intensity distribution may not be adopted. However, such a light intensity distribution is preferable for operation of a scanner. Furthermore, the LED 21 and/or the input lens 3 may be placed not at both the ends of the light guide 2 or 2A but only at either one end. Moreover, two or more of the LED 21 and/or the input lens 3 each may be placed at least at either of both the ends of the light guide 2 or 2A.

The optical element (the light guiding member 1) according to the embodiment of the present invention includes: the rod-shaped light guide 2 or 2A; and a prism part 4 or 4A which changes the direction of light input from the lengthwise end of the light guide 2 or 2A, and emits redirected light from the light exit surface 6 that is disposed opposite the prism part 4 or 4A; in which: the input lens 3, which makes light emitted from the LED 21 toward the light guide 2 or 2A nearly parallel light, is formed at the lengthwise end of the light guide 2 or 2A. On this occasion, though the prism parts 4 or 4A is so placed as to be in parallel with the light exit surface 6, it is not necessarily required to have such an arrangement. Furthermore, though the light guide 2 or 2A is rod-shaped in the embodiment, it may not be a rod-shaped member but a plane-like rectangular parallelepiped body or still a rod-shaped member but a curved rod-shaped member. Moreover, the purpose of directing the nearly parallel light toward the light exit surface 6 or the prism part 4 or 4A may be accomplished not only considering the positioning and direction of the light source but also be accomplished by contriving a shape of the input lens 3 so as to refract the input light toward the light exit surface 6 or the prism parts 4 or 4A.

The light scattering guide 5 used in the optical element (the light guiding member 1) or the light emitting device 20, 20A, 20B or 20C according to the embodiment of the present invention is rod-shaped; and a surface of the light scattering guide 5, being opposite to another surface that faces the light guide 2 or 2A, swells at a center portion in a width-wise direction to form a convex-curved surface. In this regard, the light scattering guide 5 may be not a rod-shaped member but may have another different form such as a plate-like shape that is long in the light output direction. Furthermore, the surface opposite to the other surface facing the light guide 2 or 2A in the light scattering guide 5 may have another different form such as a concave shape, in which the center part in the width-wise direction of the surface is concave, a plane surface, and the like. If such a concave shape is adopted, the output light become diffusion light, and therefore the light emitting devices 20, 20A, 20B or 20C becomes suitable as a lighting device to illuminate a wide angle range.

In the optical element (the light guiding member 1) or the light emitting device 20, 20A, 20B or 20C according to the embodiment of the present invention, the light scattering guide 5 and the light guide 2 or 2A are formed together into a single piece. In this regard, the light scattering guide 5 and the light guide 2 or 2A may be prepared as separate members. In such a case, it becomes possible to change an illumination pattern, as required according to an application and the like of the light emitting device 20, 20A, 20B or 20C.

In the optical element (the light guiding member 1) or the light emitting device 20, 20A, 20B or 20C according to the embodiment of the present invention, the light guide 2 or 2A may contain the light scattering particles for multiple-scattering the input light as described above. Furthermore, the input lens 3 may also contain the light scattering particles. When these arrangements are applied, the light scattering guide 5 and the light guide 2 or 2A can be molded together into a single piece, not through integration of two component materials, but with one and only material so that the number of manufacturing processes for the light guiding member 1 can be reduced. When these arrangements being applied, sometimes it is more likely that the stripe pattern does not appear in the intensity distribution. In this case of molding the two parts together into a single piece, the concentration of the contained light scattering particles should preferably be set lower than the concentration in the case where only the light scattering guide 5 contains the light scattering particles. The reason is that, if the concentration is set lower, light entered the light guide 2 or 2A is likely to maintain a state of parallel light.

In the optical element (the light guiding member 1) or the light emitting device 20 or 20A according to the embodiment of the present invention; both the ends of the light guide 2 are each provided with one LED 21 (light source) and one input lens 3; the light comes in from both the ends of the light guide 2 in its length-wise direction; the prism part 4 or 4A is so formed as to have a sawtooth-like cross-sectional view including a plurality of saw teeth; and in the light guide 2, the peak-to-peak pitch of the saw teeth at the center area is made to be longer than the peak-to-peak pitch of the saw teeth at both the end areas (the pitch P1 and the pitch P2). In this regard, the LED 21 (light source) and/or the input lens 3 may be placed not at both the ends of the light guide 2 but only at either one end. Moreover, two or more of the LED 21 (light source) and/or the input lens 3 each may be placed at least at either of both the ends of the light guides 2. Furthermore, the peak-to-peak pitch of the saw teeth can arbitrarily be determined according to a purpose, a use, and so on. For example; the peak-to-peak pitch of all the saw teeth may be set constant; the peak-to-peak pitch of the saw teeth at the center area may be made to be longer than the peak-to-peak pitch of the saw teeth at both the end areas (the pitch P3 and the pitch P4) of the light guide 2A, as shown in a light guide 1A, and the light emitting devices 20B and 20C; and furthermore, the peak-to-peak pitch of the saw teeth may be made to become gradually shorter as a sawtooth position is shifted toward either end of the light guide 2 or 2A.

The LED 21 used in the light emitting device 20 or 20A according to the embodiment of the present invention is shifted to an intermediate point between the axis of the light guide 2 or 2A (the optical axis M1) and the prism part 4. Then, the LED 21 used in the light emitting device 20 is so tilted at 45 degrees (the amount of tilt) with respect to the axis of the light guide 2 or 2A (the optical axis MD as to radiate light to the input lens 3 in a slantwise upward direction from a lower side in FIG. 5. Meanwhile, the LED 21 used in the light emitting device 20B or 20C according to the embodiment of the present invention is located at an intermediate point between the axis of the light guide 2 or 2A (the optical axis M1) and the light exit surface 6. The LED 21 used in the light emitting device 20B or 20C is tilted at 45 degrees (the amount of tilt) with respect to the axis of the light guide 2 or 2A (the optical axis M1) in a direction toward the prism part 4A. The shifted position and the amount of tilt may arbitrarily be modified. For example, the shifted position may arbitrarily be located at any point on a line stretching perpendicular to the light exit surface 6 from the axis of the light guide 2 or 2A (the optical axis M1) and another line stretching perpendicular to the prism part 4 or 4A from the axis of the light guide 2 or 2A (the optical axis M1). The amount of tilt may arbitrarily be set; e.g., so as to have no tilt, as shown in the light emitting devices 20A and 20B; and so as to be within a range from 5 degrees to 85 degrees while the light emitting surface of the LED 21 facing toward the axis of the light guide 2 or 2A (the optical axis M1).

What is claimed is:

1. A light emitting device comprising:
   a rod-shaped light guide;
   a light source which inputs light to the light guide; and
   a prism part which changes the direction of light input from the length-wise end of the light guide, and emits redirected light from a light exit surface that is disposed opposite the prism part; wherein
   a parallel light forming body, which makes light emitted from the light source toward the light guide nearly parallel light, is formed at the length-wise end of the light guide;
   a light emitting surface of the light source is shifted in a direction perpendicular to a center axis of the light guide from the center axis of the light guide and the optical axis of the parallel light forming body toward the side closer to the prism part, or toward the side away from the prism part, for the nearly parallel light to be directed to the light exit surface of the light guide or to the prism part;
   the light emitting surface is perpendicular to the center axis of the light guide.

2. The light emitting device according to claim 1: in which the light source is tilted with respect to the center axis of the light guide.

3. The light emitting device according to claim 1: in which the parallel light forming body is a convex lens that swells toward the light source.

4. The light emitting device according to claim 1: further comprising a reflecting member which is placed around the light source and makes light which does not enter the light guide directly from the light source input to the light guide.

5. The light emitting device according to claim 1: in which a light scattering guide, which contains light scattering particles for multiple-scattering the light emitted from the light source toward the light guide, is provided on the light exit surface of the light guide.

6. The light emitting device according to claim 1: in which the prism part is placed in parallel with the light exit surface.

7. An optical element comprising: a rod-shaped light guide; and a prism part which changes the direction of light input from the length-wise end of the light guide, and emits redirected light from a light exit surface that is disposed opposite the prism part; in which:
   a parallel light forming body, which makes light emitted from a light source toward the light guide nearly parallel light, is formed at the length-wise end of the light guide.

8. The optical element according to claim 7: in which a light scattering guide, which contains light scattering particles for multiple-scattering the light emitted from the light source toward the light guide, is provided on the light exit surface of the light guide.

9. The optical element according to claim 8: in which the light scattering guide is rod-shaped; and a surface of the light scattering guide, being opposite to another surface that faces the light guide, swells at a center part in a width-wise direction to form a convex-curved surface.

10. The optical element according to claim 8: in which the light scattering guide is formed together with the light guide into a single piece.

11. The optical element according to claim 8: in which the light scattering particles are translucent silicon particles with their particle diameter within a range from 2 to 9 micrometers.

12. The optical element according to claim 8: in which the light scattering particles contained in the light scattering guide have turbidity expressed as "$\tau$", which is a scattering parameter corresponding to a scattering coefficient of the light scattering guide, within a range of "$1<T/\tau<10$", wherein T is a maximum thickness of the light scattering guide in a direction perpendicular to the light exit surface.

13. The optical element according to claim 7: in which the light guide contains light scattering particles for multiple-scattering the input light.

14. The optical element according to claim 13: in which the light scattering particles are translucent silicon particles with their particle diameter within a range from 2 to 9 micrometers.

15. The optical element according to claim 13: in which the light scattering particles contained in the light guide have turbidity expressed as "$\tau$", which is a scattering parameter corresponding to a scattering coefficient of the light guide, within a range of "$0<L/(2\times\tau)<30$", wherein "L" is the length of the light guide in the center axis direction.

* * * * *